(12) United States Patent
Tolentino

(10) Patent No.: US 11,714,158 B2
(45) Date of Patent: Aug. 1, 2023

(54) POSITION DETERMINATION SYSTEMS AND METHODS UTILIZING ERROR OF MULTIPLE CANDIDATE POSITIONS

(71) Applicant: University of Washington, Seattle, WA (US)

(72) Inventor: Matthew E. Tolentino, Seattle, WA (US)

(73) Assignee: University of Washington, Seattle, WA (US)

( * ) Notice: Subject to any disclaimer, the term of this patent is extended or adjusted under 35 U.S.C. 154(b) by 323 days.

(21) Appl. No.: 16/999,960

(22) Filed: Aug. 21, 2020

(65) Prior Publication Data

US 2021/0055370 A1 Feb. 25, 2021

Related U.S. Application Data

(60) Provisional application No. 62/889,976, filed on Aug. 21, 2019.

(51) Int. Cl.
*G01S 5/02* (2010.01)
*G01S 5/14* (2006.01)

(52) U.S. Cl.
CPC .......... *G01S 5/0268* (2013.01); *G01S 5/0244* (2020.05); *G01S 5/0278* (2013.01); *G01S 5/14* (2013.01)

(58) Field of Classification Search
CPC .... G01S 5/0268; G01S 5/0244; G01S 5/0278; G01S 5/14
See application file for complete search history.

(56) References Cited

U.S. PATENT DOCUMENTS 6,408,246 B1 * 6/2002 Fox ..................... G01S 5/02213
701/408
6,504,794 B2 1/2003 Haase et al.
(Continued)

FOREIGN PATENT DOCUMENTS

EP 3327365 A1 5/2018
WO 2013171679 A1 11/2013
(Continued)

OTHER PUBLICATIONS

Gierlich et al., "Performance Analysis of FMCW Synchronization Techniques for Indoor Radiolocation", Proceedings of the 10th European Conference on Wireless Technology, Oct. 2017, 4 pgs.
(Continued)

*Primary Examiner* — Cassi J Galt
(74) *Attorney, Agent, or Firm* — Stoel Rives LLP

(57) ABSTRACT

Examples of systems and methods described herein may be used to track a tagged object through a scene. Techniques are described herein to calculate a position of the tag using wireless communication with multiple anchor devices. In some examples, the anchor devices may be self-localizing, e.g., they may dynamically determine their position and relationship to one another. In some examples, position of a tag may be calculated by calculating multiple candidate positions using different localization techniques—such as geometric localization techniques and/or optimization-based techniques. An error may also be identified associated with each candidate position. A final position may be determined for the tag based on the errors associated with the candidate
(Continued)

positions (e.g., the candidate position with the smallest error may be utilized as the position, e.g., the determined position, of the tag).

10 Claims, 5 Drawing Sheets

(56) References Cited

U.S. PATENT DOCUMENTS

| | | | |
|---|---|---|---|
| 6,826,117 | B2 | 11/2004 | Haase et al. |
| 8,644,113 | B2 | 2/2014 | Harrell et al. |
| 9,678,195 | B2 | 6/2017 | Mayer |
| 9,699,621 | B1 | 7/2017 | Jarrett |
| 2006/0052115 | A1* | 3/2006 | Khushu ............ G01S 3/14 455/456.3 |
| 2006/0176169 | A1 | 8/2006 | Doolin et al. |
| 2012/0314587 | A1* | 12/2012 | Curticapean ...... G01S 5/0284 370/252 |
| 2014/0028830 | A1 | 1/2014 | Kieffer et al. |
| 2015/0327022 | A1* | 11/2015 | Lin .................. G01S 5/0263 455/456.1 |
| 2016/0377697 | A1* | 12/2016 | Sella ................ G01S 5/0294 342/451 |
| 2021/0055370 | A1 | 2/2021 | Tolentino |

FOREIGN PATENT DOCUMENTS

| | | | | |
|---|---|---|---|---|
| WO | WO-2014158007 | A1 * | 10/2014 | ........... G01S 5/0252 |
| WO | 2016013286 | A1 | 1/2016 | |

OTHER PUBLICATIONS http://summitsafetyinc.com/, 1 page downloaded Dec. 2020.

Tashakkori et al., "A new 3D indoor/outdoor spatial model for indoor emergency response facilitation", Building and Environment (Jul. 2015) vol. 89, 3 pgs.

Ergen et al., "Blockage assessment of buildings during emergency using multiple types of sensors", Automation in Construction (Jan. 2015) vol. 49 Part A, 3 pgs.

Filonenko et al., "Investigating ultrasonic positioning on mobile phones", 2010 Int'l Conference on Indoor Positioning & Indoor Navigation (IPIN), Sep. 2020, 11 pgs.

Mysiris et al., "Pervasive 3D Reconstruction to Identify Hidden 3D Survival Spaces for Search and Rescue Management", 2018 IEEE 16th Intl Conf on Dependable, Autonomic and Secure Computing, Pervasive Intelligence and Computing, 4th Intl Conf on Big Data Intelligence and Computing and $3^{rd}$ Cyber Science and Technology Congress, Aug. 2018, 7 pgs.

* cited by examiner

POSITION DETERMINATION SYSTEMS AND METHODS UTILIZING ERROR OF MULTIPLE CANDIDATE POSITIONS

CROSS-REFERENCE TO RELATED APPLICATION(S)

This application claims the benefit under 35 U.S.C. § 119 of the earlier filing date of U.S. Provisional Application Ser. No. 62/889,976 filed Aug. 21, 2019, the entire contents of which are hereby incorporated by reference in their entirety for any purpose.

STATEMENT REGARDING RESEARCH & DEVELOPMENT

This invention was made with government support under Contract CNS-1742899 awarded by the National Science Foundation. The government has certain rights in the invention.

TECHNICAL FIELD

Examples described herein relate generally to position determination techniques and systems which take error into account. Examples described include self-localizing systems of anchor devices which may be used to track a tagged object through a scene.

BACKGROUND

Wireless indoor localization systems are being increasingly deployed within buildings to address personnel and asset tracking challenges. Installation of these system is often time-consuming and expensive as statically mounted devices must be precisely placed within the space to serve as fixed reference points to localize personnel moving within. Consequently, even though these systems can save lives by enabling first responders to quickly locate trapped or injured victims during emergencies such as building fires or earthquakes, the upfront installation requirement constitutes a barrier to broad adoption. For first responders this translates to increased risk during emergencies as they are relegated to leveraging the same building traversal and occupant search protocols used since the 19th century.

Despite limited information about the floor plan or hazardous conditions within buildings that are on fire, firefighters often rush inside to rescue victims and suppress structure fires. In doing so, fire response teams must not only find the source of the fire, but they must be able to find their way out of the building. Despite undergoing rigorous training on indoor navigation protocols, firefighters can still become disoriented while traversing complex buildings in smoke-filled, zero-visibility conditions. While they carry radios that can be used to help guide them out of the building if they become lost, their actual location within the building may not be clear, even to themselves. In the worst case scenario, hundreds of firefighters have died within burning buildings during response operations due to disorientation or injury.

SUMMARY

Examples of methods are described herein. An example method may include collecting a set of ranges, each of the set of ranges corresponding to a range between a particular device and a respective anchor device of a plurality of anchor devices. The method may also include calculating a first candidate position of the particular device based on the set of ranges using a geometric localization technique. The method may also include estimating error associated with the first candidate position. The method may also include calculating a second candidate position of the particular device and error associated with the second candidate position using an optimization-based technique, based on residual errors relative to each of the plurality of anchor devices. The method may also include selecting a determined position for the particular device based on the error associated with the first candidate position and the error associated with the second candidate position.

In some examples, a method may further include collecting a set of positions for the plurality of anchor devices, and using the geometric localization technique may be further based on the set of positions.

In some examples, a method may further include selecting a subset of the plurality of anchor devices for use in the geometric localization technique based on positions of the plurality of anchor devices, noise in a respective communication channel to each of the plurality of anchor devices, or combinations thereof.

In some examples, a method may include utilizing positions of more anchor devices than the subset of the plurality of anchor devices to estimate the error associated with the first candidate position.

In some examples, using a geometric localization technique may include using lateration.

In some examples, the method may further include updating the first candidate position and the second candidate position based on previous positions of the particular device to provide a smoothed first candidate position and a smoothed second candidate position. Some examples may include calculating error associated with the smoothed first candidate position and the smoothed second candidate position.

In some examples, selecting a determined position is further based on error associated with the smoothed first candidate position and the smoothed second candidate position.

In some examples, a method may include deploying the plurality of anchor devices about a scene.

In some examples, a method may include self-localizing at least one of the plurality of anchor devices when the at least one of the plurality of anchor devices is stationary.

Examples of systems are described herein. An example system may include a plurality of anchor devices. Each anchor device may include a transceiver, and a processor coupled to the transceiver and configured to self-localize a respective anchor device to determine a position of the respective anchor devices. The example system may include a tag. The tag may include a tag transceiver configured to communicate with the plurality of anchor devices, and a tag processor coupled to the tag transceiver and configured to determine a position of the tag using the respective positions of the plurality of anchor devices. The tag processor may be configured to calculate multiple candidate positions using geometric localization techniques, optimization techniques, smoothing techniques, or combinations thereof and errors associated with each of the multiple candidate positions. The tag processor may further be configured to select the position of the tag based on the errors associated with each of the multiple candidate positions.

Some example systems may include a display device in communication with the tag and configured to display an indication of the tag in accordance with the position. In some example systems, the display device may be configured to display the position of the tag together with a floorplan of a building in which the tag is deployed.

In some example systems, the plurality of anchor devices may each be configured to self-localize responsive to a determination that a respective anchor device is stationary.

In some example systems, the tag processor may be configured to determine a first candidate position of the tag using a geometric localization technique and a second candidate position of the tag using an optimization technique.

Another example method may include deploying self-localizing devices about a scene, the self-localizing devices configured to identify as anchor devices and determine positions of the anchor devices. The example method may further include moving about the scene carrying a tag, the tag configured to communicate with the anchor devices and determine a position of the tag at least in part by calculating multiple estimated positions of the tag and error associated with each of the multiple estimated positions. The example method may further include tracking the position of the tag on a display device.

Some example methods may include communicating with the tag or an object carrying the tag based on the position of the tag.

In some example methods, deploying the self-localizing devices comprises throwing at least one self-localizing device into a building, and the self-localizing device may be configured to determine its position after it comes to rest.

In some example methods, moving about the scene carrying a tag comprises walking through a building.

In some example methods, the tag may be configured to calculate a first estimated position using a geometric technique and a second estimated position using an optimization technique.

DETAILED DESCRIPTION

Figure 1:
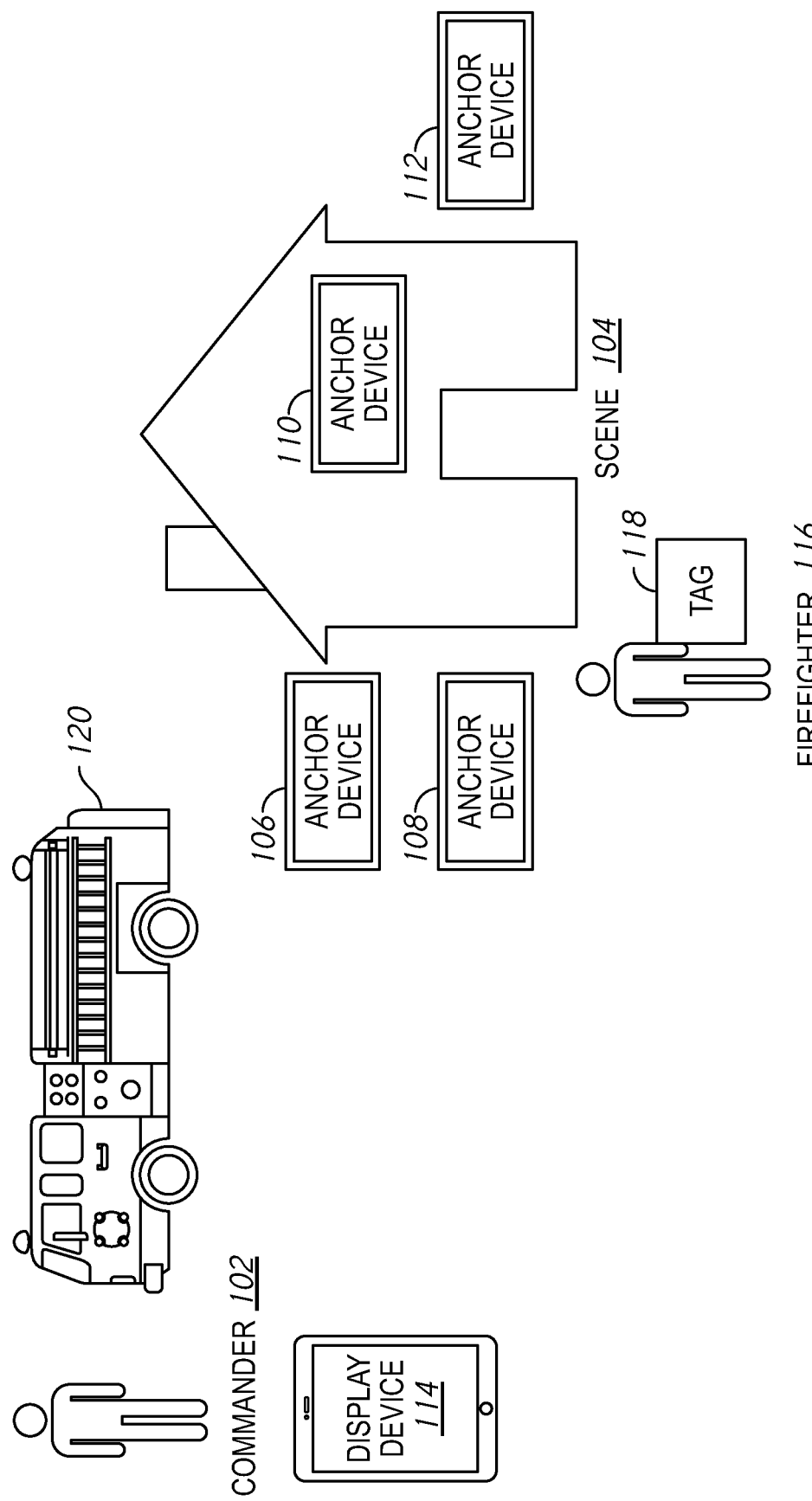
FIG. 1 is a schematic illustration of a system arranged in accordance with examples described herein.

Indoor localization systems could help mitigate the risk of becoming lost within buildings. These systems may provide the capability to track and localize personnel within environments where access to GPS satellite signals is unavailable and/or unreliable. Most indoor positioning systems include two sets of radio-based devices, anchors and tags. Anchors conventionally must be installed in fixed, known locations distributed across a space. Tags are usually attached to people or objects that move within the space. As tagged people or objects move within the space, messages are exchanged over specific radio frequencies to identify the locations of proximate anchors as well as the distances between the tag and set of anchors. The distances and anchor locations are then used to calculate tag locations using geometric lateration methods or using optimization techniques. Locations in two or three dimensions can be identified depending on the number of anchors referenced. The use of transceivers such as Ultra-Wide Band (UWB) may provide systems capable of centimeter-level tracking precision. RF-based systems traditionally may use statically-placed anchors within an indoor space with known, fixed locations.

For fire response operations and other applications, the use of an indoor positioning system could potentially save lives, cost, time, and/or otherwise improve outcomes. However, there may be several challenges. First, few buildings incorporate anchor devices that can be used to track occupants outfitted with tags. There are also many different communication transceivers that can be used for ranging by indoor positioning systems. For example, systems may use Bluetooth, Wi-Fi, Ultrasonic, or UWB-based devices. This means that firefighters may have to be outfitted with bulky tags that could be configured on arrival to work with existing installed systems. Moreover, firefighters often shut off the electrical power for buildings on fire, which could render installed indoor positioning anchors inoperable during the response operation. Consequently, static anchors installed a priori in fixed locations to track occupants may limit the use of indoor localization techniques by first responders and others.

Despite the practical uses, particularly during emergency events such as building fires, the limitations of current indoor positioning systems are inhibiting widespread deployment. The upfront cost to precisely install and configure anchors within indoor spaces is difficult and burdensome. In some cases, a complete mapping of a building must be completed as well as the locations of all installed devices measured to centimeter-level accuracy. Even after installation, all device locations must be maintained in some examples to accurately calculate the locations of tags within the space. Any device that is moved, even temporarily, would radically impact the resultant localization of tags. This means that when a building is renovated or reconfigured, devices that are not returned to their exact location can potentially impact the functionality of the system.

Finally, because anchors must traditionally be statically installed within a space, such systems are impractical to use by firefighters responding to emergencies within complex buildings. To be useful to firefighters, an indoor positioning system would have be able to self-configure by leveraging dynamically deployed anchor devices.

Examples described herein include self-localizing anchor devices that can be dynamically deployed as reference points for localizing tags within a scene, including an indoor space in some examples. These anchor devices may alleviate and/or reduce the need for costly installation and configuration of statically placed anchors. Firefighters or other users may rapidly deploy anchor devices upon arrival to a scene, e.g., a fireground, and as they enter and traverse unknown buildings or other areas. These devices may be designed to transition between multiple operating states, allowing each device to determine its position before serving as a reference point for tagged objects moving within a space. Devices may be moved during a fire response or other event, so example devices herein may include a mechanism to detect when a device changes positions. Should a device detect that it has been moved, it may cease to operate as a reference anchor and may recalculate through a series of ranging operations before resuming operation as an anchor device (e.g., a reference anchor). As these devices may be self-managed in terms of dynamically identifying and updating their positions, even when moved at a later time, they may be referred to as dynamic anchors or dynamic anchor devices.

Moreover, the accuracy of position determinations of tags is important. Any position calculation may be subject to a certain amount of error. Dynamic determination of the position of anchor devices may in some examples contribute to that error. Accordingly, examples described herein may utilize error associated with position determinations in finally determining a position of a tag.

Certain details are set forth herein to provide an understanding of described embodiments of technology. However, other examples may be practiced without various of these particular details. In some instances, well-known circuits, control signals, timing protocols, computing components, and/or software operations have not been shown in detail in order to avoid unnecessarily obscuring the described embodiments. Other embodiments may be utilized, and other changes may be made, without departing from the spirit or scope of the subject matter presented here.

Examples of systems and methods described herein may be used to track a tagged object through a scene. Techniques are described herein to calculate a position of the tag using wireless communication with multiple anchor devices. In some examples, the anchor devices may be self-localizing, e.g., they may dynamically determine their position and relationship to one another. In some examples, position of a tag may be calculated by calculating multiple candidate positions using different localization techniques—such as geometric localization techniques and/or optimization-based techniques. An error may also be identified associated with each candidate position. A final position may be determined for the tag based on the errors associated with the candidate positions (e.g., the candidate position with the smallest error may be utilized as the position, e.g., the determined position, of the tag).

Systems described herein may find use in applications providing the tracking of a tagged object through a scene. For example, a firefighter or other emergency responder may carry a tag and a commander or other user may monitor their position as they traverse a building or other recovery area. Emergency response applications may make advantageous use of the ability to dynamically set up networks of anchor devices described herein. For example, arriving firefighter(s) may deploy anchor devices about a scene on arrival, and the anchor devices may dynamically establish connectivity such that the anchor devices may be used to determine the position of tagged objects described herein.

Examples described herein may allow for the dynamic deployment of devices that can self-localize and quickly establish a highly accurate and scalable positioning system, which may be wholly or partially an indoor positioning system. Example systems may be used to track firefighters as they enter and traverse burning buildings without relying on existing infrastructure. Unlike current systems that rely on precise, manual placement of anchor devices for ranging and static assignment of role as either tag or anchor, examples described herein may allow devices to simply be activated and left in an area. Each device is designed to self-localize and operationally transition between ranging roles dynamically based on the evolving requirements of the localization system. Systems described herein may be rapidly deployed in or around any building and automatically establish a highly accurate, indoor localization system.

FIG. 1 is a schematic illustration of a system arranged in accordance with examples described herein. The system of FIG. 1 includes commander 102, scene 104, anchor device 106, anchor device 108, anchor device 110, anchor device 112, display device 114, firefighter 116, tag 118, and fire truck 120. Additional, fewer, and/or different components may be used in other examples. Generally, the anchor devices (e.g., anchor device 106, anchor device 108, anchor device 110, and anchor device 112) may be deployed about scene 104 by firefighter 116 and/or commander 102 on arrival at the scene 104 (e.g., arrival in fire truck 120). The firefighter 116 may carry (e.g., wear) tag 118. Tag 118 may communicate with one or more of the anchor devices and determine its position using techniques described herein. Display device 114 may display a position of the tag 118 (e.g., a position of the firefighter 116) as the tag 118 moves through the scene 104.

Examples of systems described herein accordingly may include one or more anchor devices, such as anchor device 106, anchor device 108, anchor device 110, and anchor device 112 of FIG. 1. Anchor devices generally refer to devices that serve as reference points for use in localizing a tag. While historically, anchor devices may have been deployed at known, fixed locations, examples of dynamic anchor devices are described and may be used herein. Generally, a Cartesian coordinate system may be used where a reference point in a scene (and/or one of the anchor devices) may be selected as an origin (0,0), and anchor devices may determine their position relative to that origin. The anchor positions may then be used to calculate locations of tags. Generally, at least three anchor devices may be used for two dimensional localization. In systems providing three dimensional localization, at least four anchor devices may generally be used. Any number of anchor devices may be provided about the scene. Anchor devices may generally be spaced apart such that a tag traversing through the scene may maintain communication with multiple anchor devices as the tag moves through the scene. In some examples, anchor devices may be positioned within 20 meters of each other, within 15 meters of each other in other examples, within 25 meters of each other in other examples. Other distances may also be used.

Anchor devices may generally include one or more transceivers for wireless communication, and one or more processing units (e.g., microcontrollers, processors, or other circuitry) to allow the anchor device to perform functions described herein. Anchor devices may include one or more antennas, transceivers, inertial measurement units, power level indicator, power source (e.g., battery), and/or one or more sensors (e.g., light, temperature, humidity, particulate).

In some examples, anchor devices may be deployed on arrival at a scene (e.g., by throwing, placing, or otherwise positioning the devices in locations around a scene and/or within buildings of the scene). In some examples, one or more anchor devices may be positioned on or carried by a vehicle, such as fire truck 120. Accordingly, the anchor devices may not be positioned in a known location. Examples of anchor devices described herein may accordingly self-localize—e.g., determine their position.

Examples of systems described herein may include one or more tags, such as tag 118 of FIG. 1. Tags are generally designed to move within a scene. A tag may be implemented as an electronic device that may be carried (e.g., worn, attached to, held by) by a user or other moveable object intended for tracking by systems described herein. In the example of FIG. 1, the tag 118 may be worn by firefighter 116. Tags may generally include one or more transceivers for wireless communication, and one or more processing units (e.g., microcontrollers, processors, or other circuitry) to allow the tags to perform functions described herein. Tags may include one or more antennas, transceivers, inertial measurement units, power level indicator, power source (e.g., battery), and/or one or more sensors (e.g., light, temperature, humidity, particulate). In general, tags may include the same and/or analogous components to anchor devices described herein. Tags and anchor devices may in some examples be interchangeable. While a single tag is shown in FIG. 1, any number may be used and in some examples may be simultaneously tracked in systems described herein.

Examples of tags described herein may communicate with one or more anchor devices to determine a position of the tag. The position of the tag may then be transmitted by the tag, e.g., to the display device 114 of FIG. 1 and/or another computing device. Advantageously, examples of tags described herein may calculate position in a manner that takes account of error associated with the position calculation. For example, tags may calculating multiple candidate positions (e.g., multiple estimated positions) for the tags, and an error associated with each candidate position. The tag may then select (e.g., transmit, report) a candidate position as the tag position based on the errors (e.g., the candidate position associated with the lowest error may be selected in some examples).

Tags described herein, such as tag 118, may generally collect (e.g., obtain) a set of ranges corresponding to ranges between the tag and each of the anchor devices in communication with the tag. For example, the tag 118 may collect a range between tag 118 and anchor device 108, a range between tag 118 and anchor device 110, and a range between tag 118 and anchor device 112. Using this set of ranges, the tag 118 may calculate a position of the tag 118. In some examples, a tag, such as the tag 118, may calculate one candidate position using a geometric localization technique (e.g., lateration). The geometric localization technique may utilize positions of the anchor devices in communication with the tag. The tag may calculate another candidate position using an optimization-based technique. The optimization-based technique may utilize residual errors relative to each of the anchor devices. The tag may further estimate (e.g., calculate) an error associated with each candidate position. The tag may select a candidate position as the final, determined position of the tag based on the errors associated with the candidate positions (e.g., the candidate position with the lowest associated error may be selected as the determined position of the tag).

In some examples, tags described herein may utilize smoothing techniques to refine candidate positions. Smoothing techniques may generally update a candidate position based on previous determined positions for the tag. For example, candidate positions calculated in accordance with geometric localization and/or optimization-based techniques may be updates based on previous positions of the tag to provide smoothed candidate positions. Error associated with the smoothed candidate positions may be estimated (e.g., calculated). The final determined position may be based on the error associated with the smoothed candidate positions.

Tags described herein, such as tag 118 of FIG. 1 may calculate their position multiple times as the tag moves around a scene. In some examples, tags may calculate position at a fixed interval (e.g., every second, every minute, etc.). In some examples, tags may calculate position when motion of the tag is detected by the tag and/or after a threshold amount of movement is detected by the tag (e.g., based on inertial sensor measurements and/or changes in range measurements obtained from anchor devices). Tags may transmit their determined position once and/or periodically over time to another computing device. For example, the tag 118 of FIG. 1 may transmit its determined position to the display device 114.

As a tag moves through a scene, the anchor devices it is in communication with may change. Accordingly, different sets of anchor devices may be used in the position calculation over time. The tag may obtain a set of positions for each anchor device in communication with the tag. For example, the tag 118 may obtain (e.g., through wireless communication) a position for anchor device 106, a position for anchor device 108, a position for anchor device 110, and a position for anchor device 112. The positions may be utilized in a geometric localization technique as described herein to calculate a candidate position. In some examples, a tag may select a subset of available anchor devices for use in the geometric localization technique. The selection may be based, for example, on noise in a respective communication channel to each of the plurality of anchor devices. For example, anchor devices may be selected which have the least amount of noise in the communication channel between the respective anchor device and the tag. When three dimensional localization is desired, generally at least four anchor devices may be selected. When two dimensional localization is used, generally at least three anchor devices may be selected. In the example of FIG. 1, the tag 118 may evaluate noise in a communication channel to the anchor device 106, noise in a communication channel to the anchor device 108, noise in a communication channel to the anchor device 110, and noise in a communication channel to the anchor device 112. The three anchor devices associated with the least communication channel noise may be selected for two dimensional localization. In some examples, more than four anchor devices may be present, and four anchor devices may be selected for three dimensional localization in accordance with techniques described herein (e.g., closest anchor devices, least communication channel noise, etc.). While a subset of anchor devices may be used to calculate candidate positions, in some examples a greater number than the subset of anchor devices may be used to estimate the error associated with the candidate position. So, for example, if four anchor devices are used to calculate a candidate position, in some examples five or more anchor devices may be used to estimate the error associated with the candidate position.

Any of a variety of applications may utilize the received position of the tag. For example, the display device 114 may display the position of the tag. In some examples, the display device 114 may display a tracked position of the tag over time. In some examples, the display device 114 may display the tracked position of the tag relative to features of the scene—for example the display device 114 may display the position of the tag 118 over time together with a floorplan or layout of a house in the scene 104—such that a position of the firefighter 116 in the house over time may be observed. A user of the display device 114 (e.g., commander 102) may accordingly observe the position of the firefighter 116. The commander 102 may utilize the display device 114 or other communication devices, to provide input and/or feedback to the firefighter 116 (e.g., instructions on how to move through the building, how to exit the building).

While an example of a firefighter has been described with respect to FIG. 1, other emergency response personnel may additionally or instead make use of the system—e.g., emergency medical technicians, law enforcement). While the scene 104 of FIG. 1 is depicted as a house, any of a variety of scenes may be used—e.g., outdoor areas, buildings, hospitals, schools, hotels, ski or other recreation areas.

Systems described herein may be used to efficiently locate tagged people and/or other objects in those scenes—e.g., employees, visitors, guests, users, children, and/or pets. Accordingly, systems described herein may be wholly and/or partially indoor positioning systems that may track a tagged object within an indoor location.

During operation of the system in FIG. 1, the firefighter 116 and commander 102 may arrive at the scene in fire truck 120. Of course, other numbers of individuals and/or vehicles may arrive in other examples. One or both of the commander 102, firefighter 116, or other individuals may deploy anchor devices, such as anchor device 106, anchor device 108, anchor device 110, and anchor device 112 about the scene. The anchor devices may be placed, thrown, scattered, dropped, etc. In some examples, drones may be used to autonomously place and/or drop anchor devices about a scene. The anchor devices may identify as anchor devices and self-localize as described herein once they are stationary in some examples.

Once the anchor devices have been positioned and self-localized, an individual or other object carrying a tag, such as firefighter 116 carrying tag 118, may be tracked. For example, the firefighter 116 may move (e.g., walk) through a building in the scene 104. The tag 118 may communicate with the anchor devices and/or a subset of anchor devices to determine candidate positions and errors associated with those positions, and determine a final determined position based on the errors associated with the candidate positions. The determined position and/or multiple determined positions over time may be tracked, e.g., using the display device 114 of FIG. 1.

Figure 2:
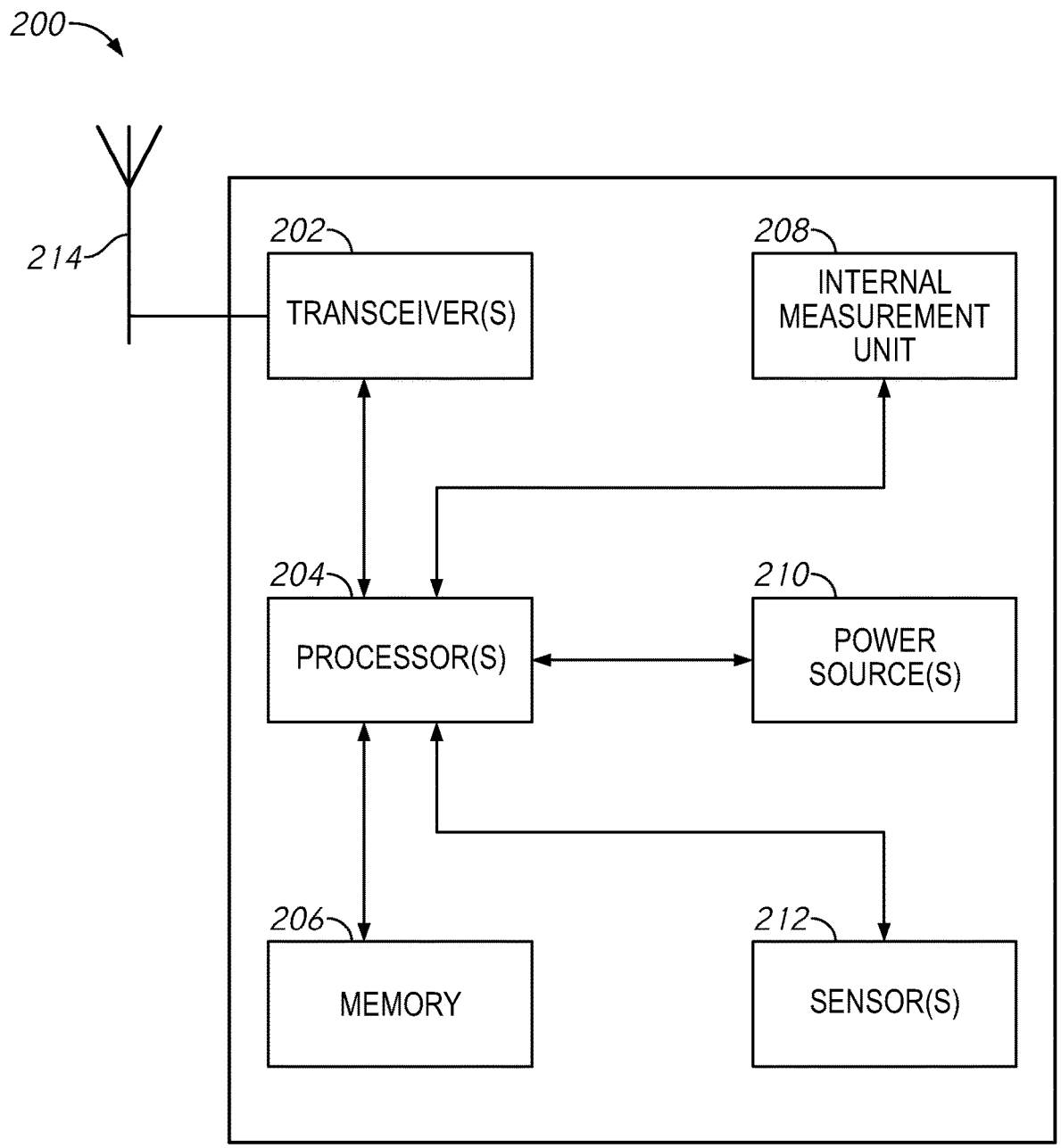
FIG. 2 is a schematic illustration of an anchor device and/or a tag arranged in accordance with examples described herein.

FIG. 2 is a schematic illustration of an anchor device and/or a tag arranged in accordance with examples described herein. The device 200 of FIG. 2 may be implemented as either an anchor device and/or tag. For example, the device 200 may be used to implement anchor device 106, anchor device 108, anchor device 110, anchor device 112, and/or tag 118 of FIG. 1. The device 200 includes transceiver(s) 202, processor(s) 204, memory 206, inertial measurement unit 208, power source(s) 210, and sensor(s) 212, antenna 214. Additional, fewer, and/or different components may be used in other examples. Generally, the components which may be utilized for anchor devices and tags described herein may be similar and/or the same. Configuration parameters particular to an anchor device and/or a tag may be stored on the device, such as in memory 206.

Examples of anchor devices and/or tags described herein may include one or more antennas, such as antenna 214 of FIG. 2. The antenna 214 may be used for wireless communication between devices described herein. For example, the antenna 214 may be used for communication between a tag and an anchor device. The antenna 214 may be used for communication between anchor devices. The antenna 214 may be used for communication between a tag and/or an anchor device and another computing device (e.g., display device 114 of FIG. 1). In some examples, switched phase antenna arrays may be used. In examples having multiple antennas, in some examples rather than or in addition to collecting sets of ranges between the tag and multiple anchor devices to compute candidate tag positions, tags may obtain sets of ranges and angle of arrival information for multiple anchor devices. Accordingly, in some examples fewer anchor devices may be used if both range and angle of arrival information between an anchor device and a tag (and/or between anchor devices) may be utilized in localizing a tag and/or an anchor device.

Examples of anchor devices and/or tags described herein may including one or more transceivers, such as transceiver(s) 202 of FIG. 2. The transceiver(s) may be coupled to antenna(s) of the device, and may be utilized for wireless communication between devices. The transceivers may utilize any of a variety of protocols, and in some examples multiple transceivers are provided to support multiple protocols and/or a single transceiver may support multiple protocols. Examples of protocols which may be used include, but are not limited to, ultra wideband (UWB), ultrasonic (e.g., 20 kHz-22 kHz), Bluetooth, Wi-Fi (both Bluetooth and Wi-Fi may operate in the 2.4 GHz spectrum), and/or operation in the sub-gigahertz range (e.g., 400 MHz and 900 Mhz ranges).

Examples of anchor devices and/or tags described herein may include one or more processors, such as processor(s) 204 of FIG. 2. The processors may be implemented using, for example, one or more central processing units (CPUs), graphics processing units (GPUs), processor cores, controllers, microcontrollers, and/or other circuitry (e.g., application specific integrated circuitry (ASICs) and/or field programmable gate arrays (FPGAs)). The processors may be configured (e.g., using executable instructions stored on computer readable media, such as memory 206, and/or stored configuration parameters and/or circuitry design) to perform actions described herein. In this manner, devices described herein may be implemented in hardware, software, firmware, or combinations thereof. Anchor devices described herein may utilize processor(s) to, for example, determine the device is stationary (e.g., once it comes to rest) and self-localize the anchor device. Tags described herein may utilize processor(s) to, for example, determine a position of the tag using positions of multiple anchor devices. The processor(s) in a tag may be used to calculate multiple candidate positions using geometric localization techniques, optimization techniques, smoothing techniques, or combinations thereof. The processor(s) in a tag may be used to estimate (e.g., calculate) errors associated with each of the multiple candidate positions. The processor(s) in a tag may further be used to select the position of the tag based on the errors associated with each of the multiple candidate positions. Executable instructions and/or configuration parameters for performing these actions may be stored, for example, in the memory 206.

Examples of anchor devices and/or tags described herein may include computer readable media, such as memory 206. While a single memory device, memory 206 is shown in FIG. 2, any number may be present an in electronic communication with processor(s) 204 in any manner. Examples of memory which may be used include random access memory (RAM), read-only memory (ROM), programmable memory, solid state drives (SSDs), other disk drives, SD cards, etc.

Examples of anchor devices and/or tags described herein may include an inertial measurement unit, such as inertial measurement unit 208 of FIG. 2. The inertial measurement unit 208 may be coupled to processor(s) 204. The inertial measurement unit 208 may measure and/or report force, angular rate, and/or orientation of the device 200. For example, the inertial measurement unit 208 may include one or more accelerometers, gyroscopes, and/or magnetometers. The inertial measurement unit 208 may be utilized in some examples in self-localizing the device 200.

Examples of anchor devices and/or tags described herein may include one or more power sources, such as power source(s) 210 of FIG. 2. The power sources may power any or all of the components of the device 200 including, but not limited to, the processor(s) 204, transceiver(s) 202, memory 206, inertial measurement unit 208, and/or sensor(s) 212. The power sources may be implemented using one or more batteries, wired power connections, wireless charging interfaces, and/or energy harvesting circuitry.

Examples of anchor devices and/or tags described herein may include one or more sensors, such as sensor(s) 212. The sensor(s) 212 may be coupled to and/or in communication with processors of the device, such as processor(s) 204. Sensor data may be used for localizing the device and/or may be used to report sensor data that may be communicated to other devices (e.g., anchor devices, tags, display devices, and/or other devices described herein). Examples of sensors which may be used include IR sensors, light sensors, temperature sensors, humidity sensors, and/or particulate sensors. While in some examples, the sensor(s) 212 may utilize processor(s) 204 and/or transceiver(s) 202 to communicate data to other device, in some examples the sensor(s) 212 may include their own communication interface (e.g., Bluetooth interface) for communication with other devices.

To calculate a position of a tag, systems described herein may obtain a set of ranges. For example, a range (e.g., distance) between the tag and each of a plurality of anchor devices may be obtained. Any of a variety of ranging techniques may be used to obtain this set of ranges. In an analogous manner, ranging techniques described herein may be used to dynamically obtain a range between an additional anchor device and an existing anchor device when the anchor devices are being set up.

Multiple protocols may be used for estimating ranges between wireless devices (e.g., between anchor devices and/or between a tag and one or more anchor devices). One approach may use an estimate of the power received during a wireless message exchange as a proxy for distance. This approach may be referred to as Received Signal Strength (RSS). While RSS techniques may be used in examples described herein, RSS distance estimation may utilize a priori calibration of device power transmission levels and may be susceptible to signal attenuation within indoor spaces. Without careful mapping of potential obstacles that interfere with signal propagation, systems that estimate distance based on RSS may be error-prone.

Another approach is to use Time Difference of Arrival (TDoA). In TDoA systems, anchors broadcast messages on a common communication channel shared with tags. Upon receipt, tags measure the transmission time of the message to estimate distance. By broadcasting to all tags, the message protocol overhead may be reduced and/or minimized. While TDoA techniques may be used in systems described herein, this techniques may utilize tight clock synchronization between all devices within the system to accurately estimate distances at high precision. Ensuring clocks are synchronized often utilizes a secondary, low-latency communication network between anchor devices to periodic correct clocks due to skew and drift. This may increase the cost and/or complexity of infrastructure using anchors.

Another approach may be referred to as two-way ranging (TWR). TWR uses messages exchanged between devices to estimate the distance between devices. Anchors and tags each track the times that message are transmitted and received over a consecutive sequence of messages. By exchanging multiple messages, the computational time used for sending and receiving devices can be isolated from the total message exchange time. This allows the total message transit time to be quantified across multiple exchanges, which can then be used to estimate the distance between two devices and may reduce and/or eliminate the need for clock synchronization. To reduce and/or minimize message handling delays, ranging messages may be incorporated into a layer-two (L2) network protocol.

Examples described herein may utilize TWR to obtain a range between two devices. For example, the tag 118 of FIG. 1 may utilize two-way ranging to obtain a range to anchor device 106, a range to anchor device 108, a range to anchor device 110, and/or a range to anchor device 112. For example, the processor(s) 204 of FIG. 2, together with transceiver(s) 202, may perform two-way ranging.

Figure 3:
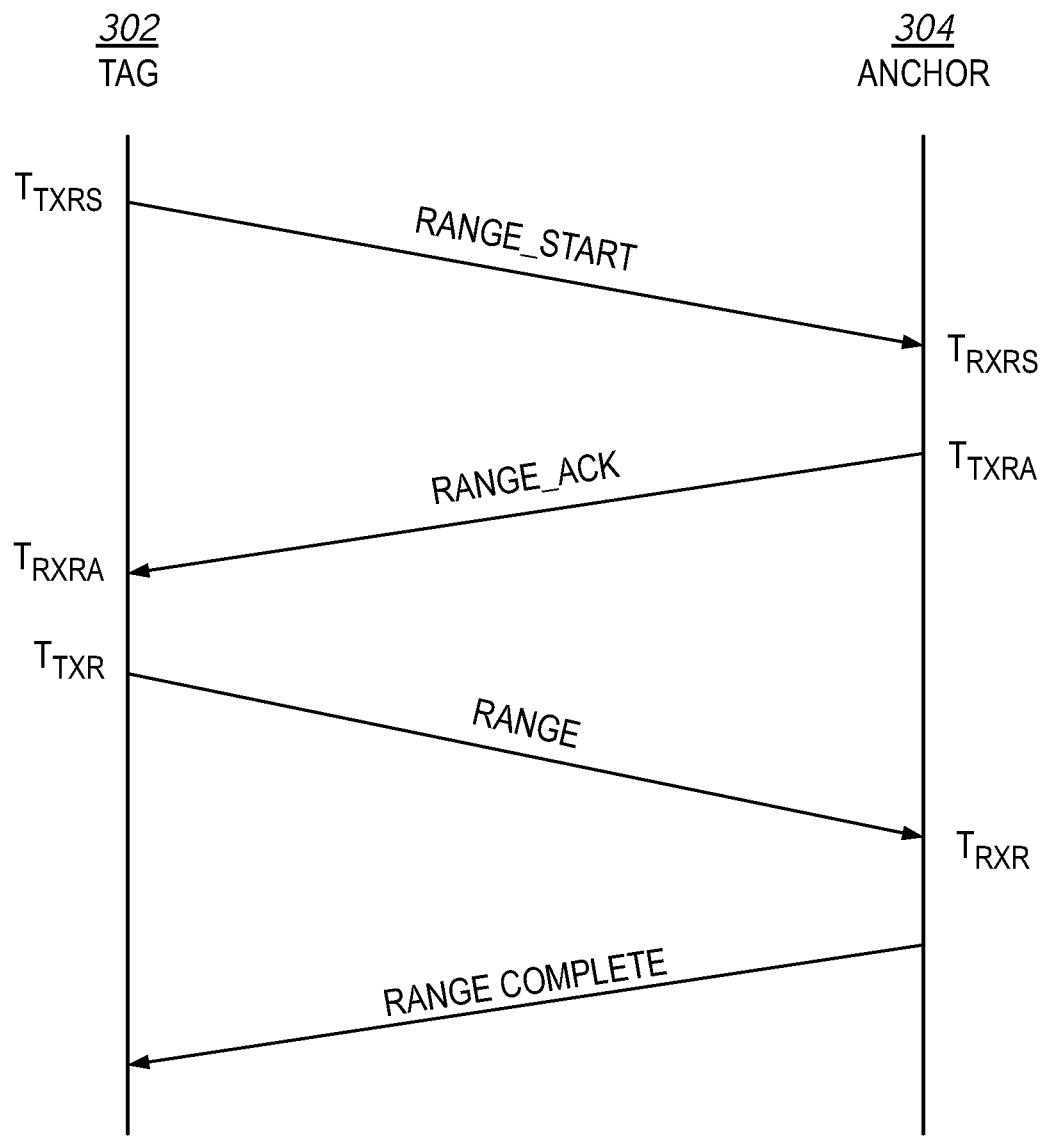
FIG. 3 is a schematic illustration of a two-way ranging protocol which may be utilized to obtain a range in accordance with examples described herein.

FIG. 3 is a schematic illustration of a two-way ranging protocol which may be utilized to obtain a range in accordance with examples described herein. In the example of FIG. 3, messages are shown exchanged between tag 302 and anchor device 304 to determine a range (e.g., distance) between tag 302 and anchor device 304. The protocol of FIG. 3 may be used to find a range between the tag 118 of FIG. 1 and any or all of the anchor devices of FIG. 1, for example. Moreover, the protocol of FIG. 3 may be used in some examples to find a range between anchor devices. For example, the processor(s) 204 and/or transceiver(s) 202 may be utilized to send and/or receive the messages shown as being sent and received by the tag 302. Other processor(s) and/or transceivers of an anchor device, analogous to those described with reference to FIG. 2, may be used to send and/or receive the message shown as being send and received by the anchor device 304.

The ranging protocol of the example of FIG. 3 uses a total of four messages exchanged between anchor device 304 and tag 302. Other numbers of messages may be used in other examples. These messages include a start message (e.g., RANGE_START of FIG. 3) used to initiate a ranging transaction with an anchor device, an acknowledge message (e.g., RANGE_ACK of FIG. 3) to respond to the initiation of a ranging transaction, a range message (e.g., RANGE of FIG. 3) to complete the message exchange to allow for distance estimation, and a complete message (e.g., RANGE_COMPLETE of FIG. 3) that transmits the estimated range back to the initiating tag.

A successful ranging transaction utilizes successful transmission and receipt of messages by communicating devices. Devices operating as tags described herein drive ranging transactions; anchor devices described herein respond to ranging requests, but generally do not initiate ranging transactions. Examples of ranging protocols described herein accordingly operate point-to-point between two devices. In this manner, ranging transactions are directed to specific anchors, based on addresses assigned to anchor devices. Anchor devices may only respond to messages encoded with a matching destination address. As a consequence, tags described herein may maintain a list or other data collection of nearby anchors to initiate ranging transactions with. Unlike some other proposed ranging protocols that incorporate a periodic message broadcast to discover nearby anchors, examples described herein may forego this feature to increase and/or maximize channel bandwidth for ranging transactions. Tags may receive periodic updates to the list or data collection of anchor devices to range with within a space from a management data plane. This communication plane may operate over a higher-bandwidth WiFi-based mesh network which may runs concurrently on devices of systems described herein, such as the system of FIG. 1. This ensures UWB may be reserved for ranging transactions. For example, tag 118 of FIG. 1 may include a transceiver operational to communicate using a Wi-Fi protocol to receive management plane data from anchor devices and/or other computing devices in communication with the tag 118

(e.g., one or more server devices, not depicted in FIG. 1). The tag 118 may additionally include the same or an additional transceiver operational to communicate using UWB with one or more anchor devices in the system to obtain a range to the anchor device.

Referring to FIG. 3, the protocol includes a start message—RANGE-START as shown in FIG. 3. Ranging transactions may be tag-initiated by transmission of the start message to a particular anchor. Each tag may create a new message with the address of the specific anchor to range with. The start message type may be encoded by the tag into the message indicating the tag is starting a new ranging transaction. After confirming the successful transmission of the start message onto the channel (e.g., UWB channel), a time stamp of the transmission time, identified by $T_{TXRS}$ in FIG. 3 is captured and stored by the tag 302. The tag 302 then configures a timeout and places the transceiver into receive mode. The timeout may, for example, be a set time after the start message transmission time. If a reply is received from the anchor device 304 before the timeout expires, the ranging protocol continues to the next phase. If the timeout expires, the transceiver of the tag 302 is taken out of receive mode, state cleared, and a new anchor may be chosen to initiate a new ranging transaction with.

Anchor devices described herein may be designed to remain in receive mode awaiting new ranging requests. When a new start message is received by anchor device 304 (e.g., at time $T_{RXRS}$ in FIG. 3), the destination address is checked to ensure the message was bound for the anchor device 304. If the message is not destined for the anchor device 304, the receive state on the transceiver of anchor device 304 may be cleared and returned to receive mode. If the anchor is the intended recipient, the receive time stamp is captured from the transceiver's time stamp register to denote the precise time it was received. This time stamp is shown in FIG. 3 as $T_{RXRS}$. The difference between time stamp of the receipt of the start message at the anchor device 304 (e.g., $T_{RXRS}$) and the time stamp of the transmission from the tag 302 (e.g., $T_{TXRS}$) constitutes the propagation time between devices.

The ranging protocol of FIG. 3 further includes an acknowledge message, RANGE_ACK. An acknowledge message may be sent by anchor device 304 in response to receiving a start message from tag 302. Transmission of this message may be used for several reasons. First, receipt of this message alerts the tag 302 of the presence of the anchor device 304. When the acknowledge message is received, the tag 302 is aware the anchor device 304 is in range and able to continue the ranging transaction. Second, a time stamp may be captured at transmission time on the anchor device 304 and upon receipt of the acknowledge message by the tag 302. These time stamps are shown as $T_{TXRA}$ and $T_{RXRA}$ in FIG. 3. These time stamps, captured on both tag and anchor sides (e.g., sender and receiver sides), allow for a second measurement of the propagation time between devices. For example, the difference between $T_{TXRA}$ and $T_{RXRA}$ provides another measurement of the propagation time.

Once an acknowledge message is received by tag 302, the protocol uses the transmission of an additional message in some examples. A range message (e.g., RANGE in FIG. 3) may be transmitted by tag 302 to anchor device 304. The range message may be transmitted to one or more anchor devices, including anchor device 304 that previously replied with an acknowledge message. The purpose of the range message may be two-fold—to measure propagation time between devices a third time and/or to transmit the time stamps collected by the tag 302 during previous message exchanges. To measure the propagation time between devices, the transmission time stamp $T_{TXR}$ is captured by the tag 302 on the sender side and the receive time stamp $T_{RXR}$ is captured by the anchor device 304 on the receiver side. To send the transmission time stamp within the range message, the tag 302 may use a delayed transmission feature of the UWB transceiver in the tag 302. By transmitting time stamps to the anchor device 304, the final distance estimate between the tag 302 and the anchor device 304 can be calculated based on the time stamps of the ranging messages as shown in equation 1.

$$T_{prop} = \frac{(T_{RXRA} - T_{TXRS})(T_{RXR} - T_{TXRA}) - (T_{TXR} - T_{RXRA})(T_{TXRA} - T_{RXRS})}{(T_{RXRA} - T_{TXRS}) + (T_{RXR} - T_{TXRA}) + (T_{TXR} - T_{RXRA}) + (T_{TXRA} - T_{RXRS})}$$  Equation 1

Either the tag 302 and/or the anchor device 304 may calculate a distance between the devices using the timestamp information from messages exchanged during a ranging protocol.

A complete message shown in the ranging protocol of FIG. 3 (RANGE_COMPLETE) may be used to transmit the final estimated range, e.g., determined by equation 1, as well as the anchor coordinates from the anchor device 304 to the tag 302. This message may not be used in determining the distance between devices; rather it facilitates the transmission of the range, which may be calculated at the anchor device 304, to be sent to the tag 302. By aggregating this information at the tag 302, the tag 302 (and other tags in the system) may independently determine its position using one or more localization techniques. Upon receipt of the complete message, the distance to the anchor device 304 may be stored by the tag 302. Although anchors are not expected to move, the tag 302 may check the Cartesian location of the anchor device 304 stored locally on the tag 302 is consistent with the location reported in the complete message. Although UWB may be less susceptible to multi-path challenges due to the use of impulse-based signaling, ranging errors are not completely eliminated. Advanced techniques such as adaptive signal filtering can be used to smooth noisy ranges in some examples.

Accordingly, the protocol of FIG. 3 may be used to collect a range between a tag and an anchor device. In examples described herein, a tag may collect a set of ranges corresponding to multiple anchor devices. Accordingly, the tag 302 of FIG. 3 may engage in the depicted ranging protocol with anchor device 304 and with additional anchor devices in a system to collect a set of ranges. Based on these ranges, the tag 302 may utilize localization techniques to calculate a position of the tag 302.

Multiple localization techniques are available for use to determine the position of an object within a space (e.g., of a tag within a scene in examples described herein). Common among these techniques, distances from multiple reference points, as well as the locations of those reference points, may be used. Using geometric techniques, the precise location of a tagged object may be determined via the intersection of the ranges to known reference points. For ranges with error, optimization techniques can be used to identify the most likely position.

An overview of example geometric localization techniques and optimization-based techniques is provided herein by way of explanation. Geometric localization techniques generally refer to techniques utilizing trilateration (for 2-dimensional localization) or quadrilateration (for 3-dimensional localization) to determine a position of a tag based on knowledge of the locations (e.g., the Cartesian locations) of multiple (e.g., three) anchor devices, and the distances between the tag and those anchor devices. The distances d1, d2, and d3 between the current tag position (x, y) and anchor device locations (x1, y1), (x2, y2), and (x3, y³) may be measured using ranging protocols, such as those described herein. Using these sets of ranges and known positions of anchor devices, the location of the tag (e.g. x, y) may be calculated by solving the system of equations 2-4.

$$(x-x_1)^2+(y-y_1)^2=d_1^2 \qquad \text{Equation 2}$$

$$(x-x_2)^2+(y-y_2)^2=d_2^2 \qquad \text{Equation 3}$$

$$(x-x_3)_2+(y-y_3)^2=d_3^2 \qquad \text{Equation 4}$$

Given this system of quadratic equations of Equations 2-4, each may be expanded and then the expanded form of equation 3 may be subtracted from equation 2 and equation 4 from equation 3. This yields equation 5 and equation 6 respectively.

$$(2x_2-2x_1)x+(2y_2-2y_1)y=d_1^2-d_2^2-x_1^2+x_2^2-y_1^2+y_2^2 \qquad \text{Equation 5}$$

$$(2x_3-2x_2)x+(2y_3-2y_2)y=d_2^2-d_3^2-x_2^2+x_3^2-y_2^2+y_3^2 \qquad \text{Equation 6}$$

For simplicity, equations 5 and 6 are shown in matrix form. The x and y coordinates of the unknown tag position may be calculated by solving equation 5 and equation 6 using Cramer's rule as shown in equations 7 and 8. For each of these, the determinant of x, or y, is found, and then divided by the determinant of the matrix form of equations 5 and 6.

$$x = \frac{\begin{vmatrix} d_1^2 - d_2^2 - x_1^2 + x_2^2 - y_1^2 + y_2^2 & 2(y_2 - y_1)y \\ d_2^2 - d_1^2 - x_2^2 + x_3^2 - y_2^2 + y_3^2 & 2(y_3 - y_2)y \end{vmatrix}}{\begin{vmatrix} 2(x_2 - x_1)x & 2(y_2 - y_1)y \\ 2(x_3 - x_2)x & 2(y_3 - y_2)y \end{vmatrix}} \qquad \text{Equation 7}$$

$$y = \frac{\begin{vmatrix} 2(x_2 - x_1)x & d_1^2 - d_2^2 - x_1^2 + x_2^2 - y_1^2 + y_2^2 \\ 2(x_3 - x_2) & d_2^2 - d_1^2 - x_2^2 + x_3^2 - y_2^2 + y_3^2 \end{vmatrix}}{\begin{vmatrix} 2(x_2 - x_1)x & y(y_2 - y_1)y \\ 2(x_3 - x_2)x & y(y_3 - y_2)y \end{vmatrix}} \qquad \text{Equation 8}$$

Note that the calculated (e.g., estimated) distances between anchor devices and tags, such as those calculated using ranging protocols described herein, may be inaccurate. This may pose a challenge for geometric lateration techniques as an exact solution for a tag's position may not exist given inaccurate ranges. Consequently, alternative approaches to localization that use optimization-based techniques can be used.

Calculating a location using ranging data may be impractical within complex indoor spaces, particularly when range estimates between anchor devices and tags are inconsistent. Optimization-based techniques generally refer to techniques which estimate a most likely position of a tag based on positions of a set of anchor devices and a set of ranges to the anchor devices. Examples of optimization-based techniques include non-linear least squares (NLLS). Optimization-based techniques may facilitate localization even in noisy or non-line of sight conditions. Additionally, any number of anchor devices can be used to estimate the tag position. Unlike lateration (e.g., geometric techniques) which can be considered to solve a system of equations to determine the position of a tag, optimization-based techniques start with an initial guess of the current tag location and calculate the error, or residuals, for each of the anchor devices. Equation 9 shows residuals for a system of equations based on locations and distances for n anchor devices.

$$(x-x_1)^2+(y-y_1)^2-d_1^2=r_1^2$$

$$(x-x_2)^2+(y-y_2)^2-d_2^2=r_2^2$$

$$(x-x_n)^2+(y-y_n)^2-d_n^2=r_n^2 \qquad \text{Equation 9}$$

Tag devices implementing optimization-based techniques may find the Cartesian (x,y) position of the tag by finding the position that meets a criteria for the residuals (e.g., minimizes the sum of the squared residuals r encoded as x^ as shown in equation 10.

$$\hat{x} = \underset{x,y}{\operatorname{argmin}} \sum_{i=1}^{n} f(x)^2 \qquad \text{Equation 10}$$

To solve, a tag may utilize a Levenberg Marquardt Algorithm (LMA) to iteratively find the tag position that satisfies equation 10. Other algorithms may be used in other examples. The Levenberg Marquardt algorithm combines Gradient Descent and Gauss-Newton algorithms by adding a damping factor λ that can be tuned to reduce the number of iterations without overshooting the global minimum. To compute, the tag may calculate partial derivatives of equation 10 with respect to x and y as shown in equations 11 and 12.

$$\frac{\partial f}{\partial x_i} = \frac{\left(2\sqrt{(x-x_i)^2+(y-y_i)^2}-d_i\right)(x-x_i)}{\sqrt{(x-x_i)^2+(y-y_i)^2}} \qquad \text{Equation 11}$$

$$\frac{\partial f}{\partial y_i} = \frac{\left(2\sqrt{(x-x_i)^2+(y-y_i)^2}-d_i\right)(y-y_i)}{\sqrt{(x-x_i)^2+(y-y_i)^2}} \qquad \text{Equation 12}$$

The partial derivatives of Equations 11 and 12 may be used to build the Jacobian matrix shown in equation 13. Note that using optimization-based localization, multiple (e.g., all) distances obtained during ranging transactions with proximate anchor devices may be used. As a result, the resultant Jacobian J includes n sets of partial derivatives, where n is the number of anchor devices the tag was able to successfully range with during the last ranging session. As a tag moves within a space, the set of anchor positions and distances may change.

$$J = \begin{pmatrix} \frac{\partial f}{\partial x_1} & \frac{\partial f}{\partial y_1} \\ \frac{\partial f}{\partial x_2} & \frac{\partial f}{\partial y_2} \\ \cdots & \cdots \\ \frac{\partial f}{\partial x_n} & \frac{\partial f}{\partial y_n} \end{pmatrix} \qquad \text{Equation 13}$$

An approximation of the Hessian (e.g., second order partial derivatives) may be calculated by taking the transpose of the Jacobian and multiplying it by the Jacobian as shown in equation 14.

$$A=H=J^T J \qquad \text{Equation 14}$$

The transpose of the Jacobian JT may then be multiplied by the residual vector r, calculated in equation 9, which product is shown in equation 15.

$$B = J^T r \qquad \text{Equation 15}$$

In matrix form, this is in the form of Ax=B, which may be solved to determine the position offsets for Cartesian locations x and y within ^x in the next iteration shown in equation 16.

$$\hat{x} = A^{-1} B = H^{-} B = (J^T J)^{-1} J^T r \qquad \text{Equation 16}$$

In this manner, optimization techniques may be used to calculate a position of a tag based on ranges to the tag, by iteratively evaluating possible positions until a constraint on a residual (e.g., minimizing a residual) is met. Tags described herein may perform the optimization-based techniques described.

Accurate distance estimation between anchor devices and tags are relevant to position precision and accuracy. While optimization-based position estimation techniques may be more resilient to ranging errors than geometric techniques, RF wave propagation through different materials may increase the propagation delay of message transmissions. These may delay results in distance estimation errors between anchor devices and tags, which may result in position errors using ToF-based distance estimation techniques. For location tracking applications these errors may manifest as tags appearing to move rapidly and randomly within a space. In the context of tracking an emergency response personnel's position in real-time to allow commanders or others to monitor responder movement—random, erratic movement of the tracked location may be problematic—particularly for disabled responders in stationary positions who may be in need of assistance, for example.

In some examples, tags described herein may utilize a localization pipeline which utilizes both geometric localization techniques and optimization-based techniques to calculate a final tag position. One path utilizes geometric localization techniques to generate candidate position(s). Another path utilizes optimization-based techniques, including using the Levenberg Marquardt Algorithm (LMA), to generate candidate position(s). The two paths use a set of anchor ranges and positions collected by a tag during ranging transactions. The pipeline may further utilize adaptive position filtering and error characterization. For example, adaptive position filtering techniques and/or error characterization may be applied to candidate position(s), which may wholly or partially compensate for ranging errors and generate refined or updated candidate position(s). Use of such a pipeline approach may in some examples smooth tag position estimates in the presence of ranges with errors. Candidate positions may be evaluated based on errors associated with the candidate positions. A candidate position may be selected as the position of the tag based on the candidate position having a lowest error, or whose error otherwise meets some error criteria.

Figure 4:
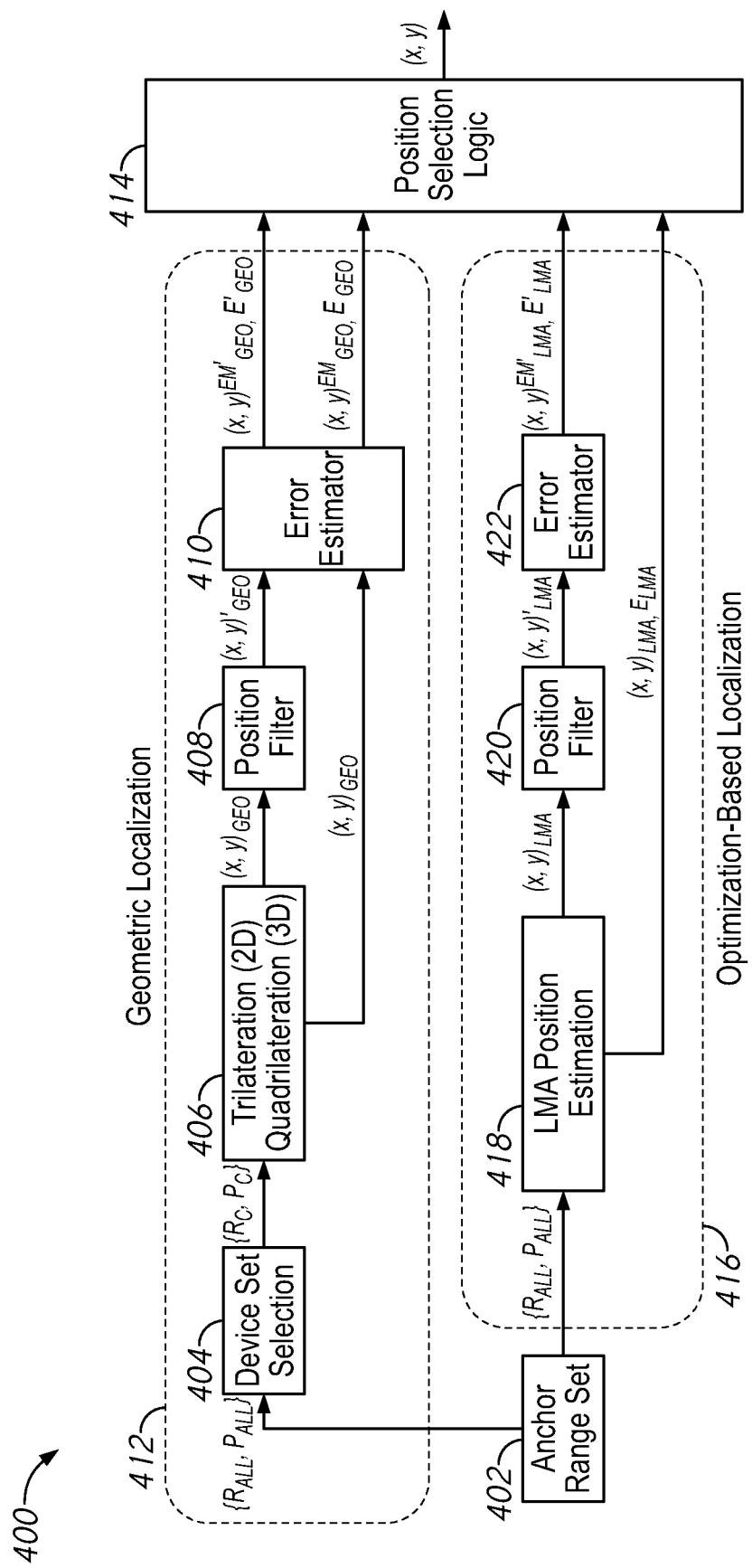
FIG. 4 is a schematic illustration of a localization pipeline 400 arranged in accordance with examples described herein.

FIG. 4 is a schematic illustration of a localization pipeline 400 arranged in accordance with examples described herein. The localization pipeline 400 may be implemented by tags described herein, such as by tag 118 of FIG. 1. For example, the processor(s) 204 of FIG. 2 may perform the calculations used to implement localization pipeline 400. In some examples, anchor devices described herein may implement localization pipeline 400 or portions thereof. The localization pipeline 400 includes geometric localization path 412 and optimization-based localization path 416. The localization pipeline 400 includes set of ranges 402 that may be provided to both geometric localization path 412 and optimization-based localization path 416. The geometric localization path 412 includes device set selection 404, lateration 406, position filter 408, and error estimator 410. The optimization-based localization path 416 includes position estimation 418, position filter 420, and error estimator 422. An output of the geometric localization path 412 and an output of the optimization-based localization path 416 is provided to position selection logic 414 to finally determine a position of the tag or other device implementing localization pipeline 400. Additional, fewer, and/or different components may be used in other examples. Note that for spatial convenience in FIG. 4 the notations refer to two-dimensional localization without loss of generality—other numbers of dimensions may be used in other examples.

Each tag may collect, for example, using ranging protocols described herein, a set of ranges corresponding to ranges between the tag and each of multiple anchor devices. In FIG. 4, this set of ranges is depicted as set of ranges 402. The set of ranges 402 may be stored, for example, in a memory of a tag. The set of ranges is represented as $R_{ALL}$. Additionally, the tag may have obtained a set of anchor positioned, which may be reported from the anchor devices and may additionally be stored, for example, in a memory of a tag. The set of anchor device positions is represented as $P_{ALL}$ in FIG. 4. The set of ranges and positions (represented as tuple ($R_{ALL}$, $P_{ALL}$) may be provided as input to the two localization paths—the geometric localization path 412 and the optimization-based localization path 416. The geometric localization path 412 may be used (e.g., as implemented by processor(s) 204 of FIG. 2) to calculate a candidate position for the tag using geometric localization technique(s). The optimization-based localization path 416 may be used (e.g., as implemented by processor(s) 204 of FIG. 2) to calculate a candidate position for the tag using optimization-based technique(s). The multiple candidate positions may be calculated wholly and/or partially in parallel. As shown in FIG. 4, the geometric localization path 412 and optimization-based localization path 416 may operate in parallel.

Examples of tags described herein may accordingly implement a geometric localization path, such as geometric localization path 412 of FIG. 4 to calculate a candidate position of the tag using geometric localization techniques (e.g., lateration). Referring to geometric localization path 412, a set of anchor ranges and positions collected during a set of ranging transactions are provided as input. This is shown in FIG. 4 as $\{R_{ALL}, P_{ALL}\}$. In some examples, such as example systems with a dense deployment of anchor devices, not all ranges and positions collected during a ranging session may be used for geometrically locating the tag. In some examples, some combinations of devices may not be viable or desirable, such as if the positions of those anchors are collinear when localizing in two dimensions, or co-planar when localizing in three dimensions. Accordingly, the geometric localization path 412 may select a subset of anchor devices with valid and/or desirable range and position data, shown in FIG. 4 as $\{R_C, P_C\}$. The selection is made from all available ranges and position data ($R_{ALL}$, $P_{ALL}$.

The selection of ranges and positions for use in geometric localization path 412 may be made in any of a variety of ways. For example, range and position date of the closest devices may be used. So, range and position data may be selected for a threshold number of devices that have the closest range to the tag. In some examples, the number selected may be three for 2D localization, four for 3D localization. In some examples, the standard deviation (or other parameter) of noise in a communication channel observed during ranging may be used to select range and position data. For example, range and position data may be selected from a threshold number of anchor devices having a lowest amount of noise in the respective communication channels between the anchor devices and the tag. An initial candidate position for the tag may be calculated using lateration 406 in the target number of dimensions (e.g., 2 or 3). The initial candidate position is represented in FIG. 4 at $(x,y)_{GEO}$.

After an initial candidate position $(x, y)_{GEO}$ is determined using lateration 406, additional stages may be included in the geometric localization path 412. For example, the position estimated via lateration may be evaluated relative to the set of ranges and positions for the anchor device $\{R_{ALL}, P_{ALL}\}$. The evaluation may be performed by error estimator 410 of FIG. 4, which may be implemented by a processor, such as processor(s) 204 of FIG. 2. The error estimator 410 uses the initial candidate position input $(x, y)_{GEO}$ as a starting position and calculates an error (e.g., the sum of squared errors (SSE)) for that position. The SSE algorithm may iteratively adapt $(x, y)_{GEO}$ until the error is minimized (or meets another error criteria), as described by equation 10 for example, resulting in a new estimated candidate position $(x, y)^{EM'}{}_{GEO}$, with an associated quantified error value $E_{GEO}$ relative to all utilized (e.g., in-range) anchor devices. Starting with the lateration-estimated position may minimize and/or reduce the number of iterations used by error estimator 410, which may reduce the computational load on tags and prolong battery life. Leveraging more than the selected number of anchor device ranges and positions (e.g., all available anchor ranges and positions) for error characterization (e.g. $\{R_{ALL}, P_{ALL}\}$) rather than the subset used for lateration ($\{R_C, P_C\}$) may further refine the quality of the estimated position using more available information.

Examples of geometric techniques used to generate candidate positions described herein may include the use of smoothing techniques to generate smoothed candidate positions. Referring to FIG. 4, concurrent to generating $(x, y)'_{GEO}$, a position filter 408 may be used. Any of a variety of filters may be used, such as a set of one-dimensional Kalman filters. The position filter 408 may be used to dampen changes to the candidate position relative to previous positions, which may be due to ranging variance caused by obstructions or interference during building traversal. Some examples may utilize one or more Kalman filters which predict or project the state of a variable (e.g., position) into the future and then use position measurements as feedback. Kalman filters may facilitate the incorporation of both process and measurement noise on the a priori predictions to improve a posteriori state estimates. The state of each dimensional position $x_k$ may be estimated through the linear stochastic difference equation shown in equation 17, with measurement $z_k$ shown in equation 19.

$$x_k = Ax_{k-1} + Bu_k + w_{k-1} \quad \text{Equation 17}$$

$$x_k = x_{k-1} + w_{k-1} \quad \text{Equation 18}$$

$$z_k = Hx_k + v_k \quad \text{Equation 19}$$

In equation 17, position $x_k$ is determined by adding the last estimated position multiplied by matrix A with control input $u_k$ multiplied by matrix B and process noise $w_k-1$. Because the signal (e.g., position) is one-dimensional, matrices A and B reduce to single numeric values where both are equal to one. Also, because specific control signals may not be exerted on the generated positions, the control input may be set to 0, $u_k=0$. For process noise, a constant value may be used. These simplifications reduce equation 17 to equation 18.

Equation 19 combines the measured position with measurement noise. Similar to matrices A and B because the signal is one-dimensional, matrix H reduces to a single numeric value of one. To determine measurement noise $v_k$, the estimated noise from earlier empirical ranging experiments may be used. Given state equations 17 and 19, the Kalman filter includes two steps—the time update or predict step and measurement update or correction step. The prediction step may be written as equations 20 and 21.

$$x_k^- = Ax_{k-1} + Bu_k \quad \text{Equation 20}$$

$$P_k^- = AP_{k-1}A^T + Q \quad \text{Equation 21}$$

Equation 20 describes the prior state estimate based on the previous with control signal input. Equation 21 describes the prior error covariance. These values may be used in the second, measurement, step of the Kalman filter which may be described with equations 22-24.

$$K_k = P_k^- H^T (HP_k^- H^T + R)^{-1} \quad \text{Equation 22}$$

Kalman gain $K_k$ may be calculated, as shown in equation 22. This involves multiplying the previous error covariance which was determined during the time prediction step in equation 21 divided by the predicted error covariance combined with R, which represents the uncertainty of measurement, which may be due to noise in the environment. Because the signal is one dimensional and positions do contain noise, H may be taken as equal to one. This reduces the computation of the Kalman gain to equation 23.

$$K_k = \frac{P_k^-}{P_k^- + R} \quad \text{Equation 23}$$

Given the Kalman gain $K_k$ and new position measurement $z_k$ obtained after ranging and lateration, the a posteriori position estimate $x_k$ may be updated to incorporate the latest measurement update. This is shown in equation 24.

$$x_k = x_k^- + K_k(z_k - x_k^-) \quad \text{Equation 24}$$

To determine the a posteriori estimated position $x_k$, the difference between the current measured position $z_k$ and the previous estimated position may be multiplied by the Kalman gain $K_k$, which was computed earlier in equation 23. This result may be added to the previous estimated position $x_k-$ as shown in equation 24.

The measurement update phase of the Kalman filter may include recalculating the uncertainty in the estimate based on a posteriori error covariance estimate using the updated Kalman gain.

The updated predicted estimates for each positional dimension may be combined using each one-dimensional Kalman filter to generate a new filtered position, shown as $(x, y)'_{GEO}$ in FIG. 4. This position may be used as a starting point in the same SSE-based error estimator described earlier (e.g., error estimator 410). The output of the error estimator is a candidate position estimate $(x, y)^{EM'}{}_{GEO}$ with error value $E'_{GEO}$. Note that in the ideal case, $(x, y)^{EM'}{}_{GEO}$ and $(x, y)^{EM}{}_{GEO}$ may be equal, however in practice, the values may be different. For example, given different starting points, these positions may vary with clearly different error values.

In this manner, the geometric localization path 412 may provide candidate position(s) for a tag. In some examples, one candidate position and an associated error value may be provided based on lateration, and without smoothing. Another candidate position and associated error value may be provided that may include smoothing (e.g., using position filter 408). In some examples, only one or the other of these candidate values may be generated by geometric localization techniques, both may not always be provided. The candidate position(s) generated by the geometric localization path 412 may be provided to position selection logic 414.

Examples of localization pipelines described herein may include an optimization-based path for calculating candidate position(s) using optimization-based techniques. In the example of FIG. 4, the localization pipeline 400 includes optimization-based localization path 416. The optimization-based localization path 416 uses the set of anchor ranges and positions (e.g., set of ranges 402) $\{R_{ALL}, P_{ALL}\}$ to estimate tag position. The set of ranges 402 are provided as input to optimization-based localization path 416. The optimization-based localization path 416 may utilize LMA in position estimation 418 to generate a candidate position. LMA uses the sum of squared error algorithm (SSE) internally. Consequently, the output of position estimation 418 is a candidate position, shown as $(x, y)_{LMA}$, which also includes an error value $E_{LMA}$, associated with the candidate position. The resultant candidate position may be output directly to the position selection logic 414 as shown in FIG. 4.

Additionally in some examples, or instead in some examples, the candidate position $(x, y)_{LMA}$ may be used as input to a separate set of position filter(s), position filter 420, which may be implemented using one or more one-dimensional Kalman filters. The same filtering techniques may be used by position filter 420 as described with respect to position filter 408. For position filter 420, the set of inputs is the candidate position generated by position estimation 418 (e.g. $(x, y)_{LMA}$) which yields a new, smoothed candidate position, $(x, y)'_{LMA}$. This new position may then be evaluated by an SSE-based error estimator, error estimator 422, resulting in position $(x, y)'_{LMA}$ with associated error estimate $E'_{LMA}$ that may also be provided as input to position selection logic 414.

Accordingly, an optimization-based localization path, such as optimization-based localization path 416, may provide one or more candidate positions based on optimization-based localization techniques. One candidate position is represented as $(x,y)_{LMA}$ in FIG. 4. A second candidate position may be a smoothed version of the initial candidate position, e.g., $(x, y)'_{LMA}$ in FIG. 4. Both candidate positions may have associated error values.

In this manner, in the example of FIG. 4, the position selection logic 414 may receive four candidate positions—a candidate position and a smoothed candidate position from both geometric localization path 412 and optimization-based localization path 416. Associated errors are also received for each of the four candidate positions. In other examples, the position selection logic 414 may receive a different number of candidate positions, including two candidate positions (one each from the geometric localization path 412 and optimization-based localization path 416—either the original or smoothed candidates or a mix of both).

The position selection logic 414 of FIG. 4 receives as input four input tuples including $\{(x, y)^{EM'}_{GEO}, E'_{GEO}\}$, $((x, y)^{EM}_{GEO}, E_{GEO})$, $\{(x, y)^{EM'}_{LMA}, E'_{LMA}\}$, and $\{(x, y)_{LMA}, E_{LMA}\}$. After receiving these four tuples, the position selection logic 414 compares the error estimates for each, may record the possibilities for later analysis, and selects the position estimate based on the error values (e.g., selects the candidate position associated with lowest error). This selected position may be output as the determined, current, tag position (x, y) by the localization pipeline 400.

The localization pipeline 400, including the position selection logic 414 may, for example, be implemented using tag 118 of FIG. 1, and may be implemented by the processor(s) 204 of FIG. 2 for example. The determined position may be transmitted, e.g., using transceiver(s) 202 of FIG. 2 to another computing device, such as the display device 114 of FIG. 1.

Examples described herein may include self-localizing anchor devices. For example, the anchor device 106, anchor device 108, anchor device 110, and/or anchor device 112 of FIG. 1 may be self-localizing. The use of self-localizing anchor devices may be particularly advantageous in example where first responders arrive at a scene and desire to dynamically deploy a tracking system. Anchor devices described herein may include one or more microcontrollers, ultra-wide band transceivers, and/or inertial measurement units (as generally shown in FIG. 2) and may be quickly deployed in an emergency to establish an accurate indoor positioning system. This design allows each device in a system to independently determine its location without the need to access a server, Internet, and/or cloud-based computing device in some examples.

In some examples, anchor devices may be moved during operation of the system, either purposefully or accidentally. Examples described herein may accordingly include movement detection in anchor devices. This may allow anchor devices to automatically recognize the need to reevaluate position before continuing to operate as a reference point within a scene. Moreover, techniques may be used to track tags within a scene (e.g., an indoor space) and allow the translation of localized positions (e.g., indoor positions) into geodetic coordinate systems in realtime. Example systems may be used by firefighters arriving at a building that is currently on fire, but in other examples, other indoor spaces and/or scenes may be used.

Most indoor positioning systems localize objects using either two or three dimensional Cartesian coordinate systems. To project the indoor locations of objects using geodetic coordinate systems, a mapping between the coordinate system used within the building and specific locations of latitude, longitude, and altitude may be established. Example systems described herein may establish this mapping dynamically upon deployment using a set of self-localizing anchor devices, in some examples augmented with high-precision GPS devices.

Some anchor devices may accordingly be referred to as super-beacons which may refer to anchor devices that self-localize across both the geodetic coordinate system and a dynamically instantiated Cartesian coordinate system. These devices may form the base reference points for the remainder of the position system and allow for the translation of Cartesian coordinates for all devices within a scene (e.g., a building) to geodetic coordinate systems to provide location visualization using mapping-based frameworks.

During the initial deployment of anchor devices at a scene, a number of super-beacons may be activated upon arrival. In some examples the anchor device 108, anchor device 110, anchor device 112, and/or anchor device 106 may be super-beacons. In some examples, the super-beacons may be deployed on or near the fire response equipment outside the scene (e.g., on the fire truck 120). The initialization sequence for these devices is similar to regular anchor devices, except that they also initialize an embedded GPS receiver. Unfortunately, the accuracy of most single-channel GPS receivers is limited to within about five meters (16 feet). The dynamically deployed indoor localization system should in some examples be capable of centimeter-level precision, however, and the establishment of the Cartesian system within the building is based on the accuracy of the position of these super-beacons. Accordingly, in some examples, single-channel GPS receivers may be insufficient or undesirable. To improve precision, each super-beacon may be equipped with a dual-frequency GPS receiver with the capability to receive differential correction signals from nearby base stations. The use of dual-frequency GPS receivers with augmented real-time kinematics signals may facilitate centimeter-level precision of tag location.

After each super-beacon establishes its geodetic location, the Cartesian coordinate system may be established that will be used while on-scene and correlate the Cartesian positions of the super-beacons with geodetic locations. For this, one of the super-beacons may be designated to function as the root super-beacon (e.g., anchor device 106). There may be one such root anchor device and it may have a fixed identifier. The root super-beacon establishes the origin of the Cartesian system and initializes at the origin position of (0, 0, 0). Because the Cartesian location of the root super-beacon is predetermined, once initialization is complete, it may transition to operate in anchor mode. Additionally, the geodetic location of the root superbeacon is now correlated to the Cartesian origin.

After the other super-beacons are initialized (e.g., anchor device 108, anchor device 110, and/or anchor device 112 of FIG. 1), they each initiate a ranging transaction, operating analogous to a ranging tag described herein, with the root super-beacon (e.g., anchor device 106). This ranging transaction with the root super-beacon may acquire the geodetic location of the root super-beacon, as each complete message may include the latitude, longitude, and altitude of the device operating as an anchor. The super-beacons then calculate the difference between the latitude, longitude, and altitude (converted to meters in some examples) of the root super-beacon and its own geodetic location to establish its (x, y, z) position of the anchor device within the newly established Cartesian coordinate system. Once each super-beacon has dynamically determined its Cartesian location, it transitions to operate as an anchor (e.g., to serve as a reference point during tag tracking/localization). Subsequent dynamically-deployed anchors can now range with the super-anchors as fixed known reference points in the space. Moreover, because each super-beacon has both a Cartesian position and a geodetic position, a mapping function may be established to project the location of tags and anchors with valid Cartesian locations into the geodetic space, allowing the use of mapping-based applications for visualizing personnel within a scene.

Self-localizing anchor devices may initially determine their location before responding to ranging requests within a space. Tags range with anchors because they serve as fixed reference points within a space to localize. However, unlike statically installed anchors, dynamic anchors may not be initially configured with a fixed location within a scene. To enable self-localization, examples of anchor devices described herein may progress through a sequence of initialization states before operationally responding to ranging requests from tags. Additionally, to allow dynamic anchor devices to automatically detect movement and recalculate position, a state machine may be implemented by anchor devices described herein.

Figure 5:
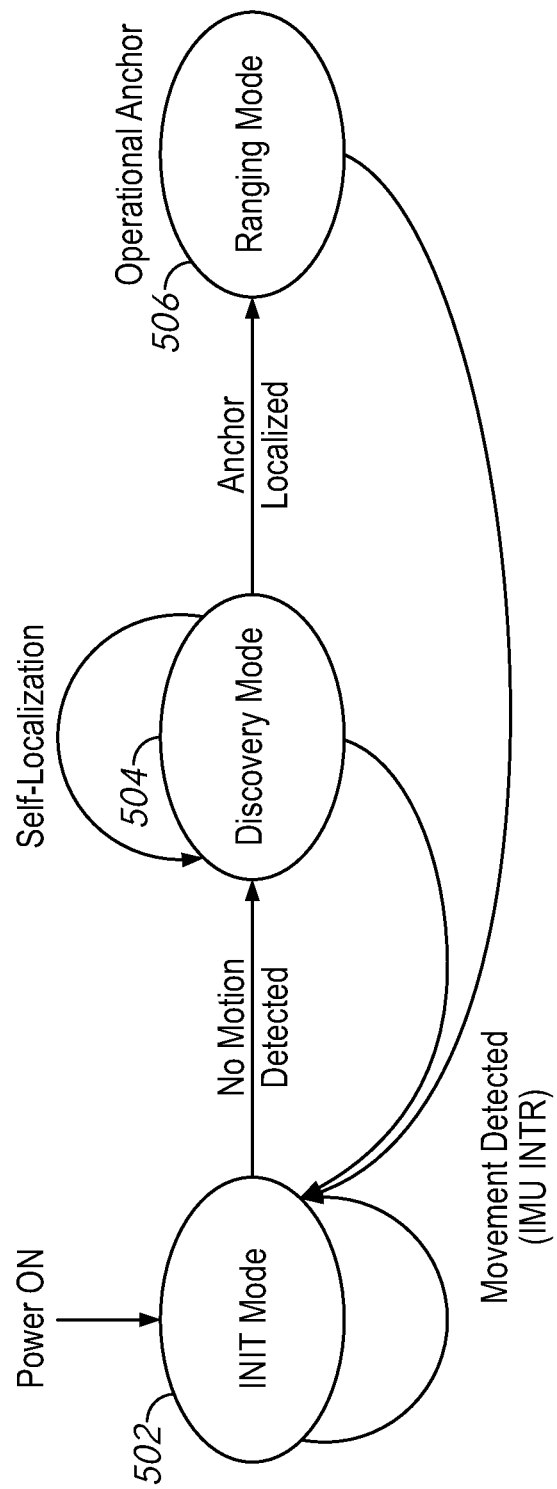
FIG. 5 is a schematic illustration of a state machine for operational states of anchor devices arranged in accordance with examples described herein.

FIG. 5 is a schematic illustration of a state machine for operational states of anchor devices arranged in accordance with examples described herein. The example of FIG. 5 includes an initialization mode 502, discovery mode 504, and ranging mode 506. The diagram of FIG. 5 depicts how the various modes are arrived at and transitioned between. The state machine of FIG. 5 may be implemented by anchor devices described herein, such as anchor device 106, anchor device 108, anchor device 110, and/or anchor device 112 of FIG. 1. A processor of the anchor device(s), such as processor(s) 204 of FIG. 2 may be used to implement the state machine. Additional, fewer, and/or different states or transitions may be used in other examples. The state machine of FIG. 5 is intended to depict an example of operational modes used to initialize self-localizing anchor devices upon power-on as well as actions to re-calibrate an anchor's position when movement is detected.

Anchor devices described herein may have an initialization mode, such as initialization mode 502 of FIG. 5. When a self-localizing anchor device is first powered on, it may transition into initialization, or INIT, mode. In the INIT mode, the anchor device may monitor the movement of the device (e.g., using an inertial measurement unit, such as inertial measurement unit 208 of FIG. 2). As long as the device remains moving, as detected through the accelerometer and gyroscope within the inertial measurement unit, for example, the anchor device may remain in the IN IT mode. This may aid in ensuring that anchor devices powered-on and then thrown into a scene may delay position calculation until they have reached a stable position within the space (e.g., until they come to rest or are stationary). After no additional movement is detected for a predetermined time, the anchor transitions to a discovery mode, shown as discovery mode 504 in FIG. 5.

Anchor devices may self-localize while operating in discovery mode. To transition into discovery mode, anchors may first have been determined to be in a stable, e.g., non-moving state. For example, an anchor device may be deployed by a first responder by having been dropped on the floor while traversing a building. After the device stops moving, it enters discovery mode, such as discovery mode 504. In this mode, the anchor device generally operates as a tag described herein, in that the anchor device in discovery mode may drives ranging transactions to identify the locations of other anchor devices and the distances to those anchor devices to determine a position of the anchor device in discovery mode. Ranging techniques, and position determination techniques described herein, such as with reference to FIG. 3 and FIG. 4 for tags, may be used by the anchor device in discovery mode to determine position of the anchor device.

In examples of positioning systems described herein, it is generally tags that initiate ranging transactions. Anchor devices in operation simply respond to ranging transaction requests from tags. Because the UWB channel used by all devices may be shared, access to the channel to initiate ranging transactions may be managed explicitly. In many systems this is managed using one of several protocols such as time-division multiple access (TDMA), carrier sensing, or collision detection such as ALOHA. In examples described herein, token passing may be used to provide channel access atomicity, avoiding or reducing collisions during ranging. Static anchors generally will not participate in token exchanges as they don't initiate ranging transactions. However, while in discovery mode, dynamic anchor devices may drive ranging transactions with anchor devices operating in ranging mode, and therefore may participate in token ring exchanges with tags. Accordingly, tags may be aware of not just other tags in the system, but also of dynamic anchors that may utilize the token. This may reduce the available ranging bandwidth within the localization system, but in most cases is limited to the initialization phase of the system.

After ranging with a sufficient number of nearby anchor devices, dynamic anchor devices estimate their current position using one or more of the localization techniques such as lateration or non-linear least squares. In example systems, a combination of these techniques may be used with position filtering to estimate position. As an initial matter, the anchor device may first acquire a channel lock (e.g., with a token). In the token ring approach, the wait time for the lock may be proportional to the current number of tags and dynamic anchor devices. After acquiring the lock, the anchor device may then attempt to range with other known anchor devices. A symmetric two-way ranging protocol, which requires an exchange of multiple (e.g., three) messages between the initiator and each anchor device. The actual distance between devices is calculated by the anchor device and then sent in a subsequent message back to the initiator along with the anchor's current Cartesian location. If an anchor device does not respond to ranging transaction requests, it may be assumed to be out of range or inoperable and may not be used further. After ranging with all known anchor devices, the channel access lock may be freed by passing the token onto the next initiator device in the ring.

Given ranges to anchor devices, along with current anchor device locations, a device selection algorithm may be used to identify candidate anchor devices to use for estimating position geometrically, e.g., through trilateration. In some examples, a number (e.g., three) of the closest anchors to estimate position of the anchor device that is in discovery mode. The anchor device may calculate a sum of squared error for the position estimated through the geometric technique using the anchor devices with non-zero ranges.

After estimating its position, self-localizing anchor devices transition to ranging mode, such as ranging mode 506 of FIG. 5. However, if the anchor device detects that it has moved, it may transition back to initialization mode. Accordingly, if the anchor device is moved, for example kicked after being dropped or moved by nearby rescue equipment such as a hose, the operating state of the anchor device may be transitioned back to initialization mode 502 as shown in FIG. 5. In this manner, inaccurate ranges may be avoided due to unexpected movement of an anchor device. Recall that during ranging transactions, the anchor positions are encoded into the ranging protocol in addition to the range, as they may be used for localization. If an anchor device is moved into a new position and continues to range, the actual range may be accurate, but the position would be stale. Consequently, when an incorrect position and range for even a single anchor is used to estimate the position of a tag, the calculated position may be incorrect. Consequently, it may be advantageous that if an anchor is moved, its position is reevaluated to prevent errors in tag position estimates.

Once a dynamic anchor device has determined its current position, it may transition into ranging mode, e.g., ranging mode 506 of FIG. 5. In ranging mode, anchor devices may place their transceiver (e.g., UWB transceiver) into receive mode and wait until an initial ranging message, with a matching destination address, is received (e.g., from a tag). The anchor device then may follow the same ranging protocol used for statically placed anchors and/or described herein with reference to FIG. 3. However, if movement is detected at any time while operating in ranging mode, the anchor device may transition back into initialization mode as shown in FIG. 5.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
deploying a plurality of anchor devices about a scene;
monitoring movement of a respective anchor device of the plurality of anchor devices using an inertial measurement unit of the respective anchor device to determine when the respective anchor device is stationary;
determining a position of the respective anchor device when it is stationary;
collecting a set of ranges based on wireless message transmissions, the set of ranges including a range between a particular device and the respective anchor device;
calculating a first candidate position of the particular device based on the set of ranges and one or more positions of one or more anchor devices among the plurality of anchor devices using a geometric localization technique;
estimating error associated with the first candidate position;
calculating a second candidate position of the particular device and error associated with the second candidate position using an optimization-based technique, based on residual errors relative to the one or more positions and distances for the one or more anchor devices of the plurality of anchor devices;
selecting a determined position for the particular device based on the error associated with the first candidate position and the error associated with the second candidate position.

2. The method of claim 1, further comprising collecting a set of positions for the plurality of anchor devices, and wherein using the geometric localization technique is further based on the set of positions.

3. The method of claim 1, further comprising selecting a subset of the plurality of anchor devices for use in the geometric localization technique based on positions of the plurality of anchor devices, noise in a respective communication channel to each of the plurality of anchor devices, or combinations thereof.

4. The method of claim 3, further comprising utilizing positions of more anchor devices than the subset of the plurality of anchor devices to estimate the error associated with the first candidate position.

5. The method of claim 1, wherein said using a geometric localization technique comprises using lateration.

6. The method of claim 1, further comprising further updating the first candidate position and the second candidate position based on previous positions of the particular device to provide a smoothed first candidate position and a smoothed second candidate position.

7. The method of claim 6, further comprising calculating error associated with the smoothed first candidate position and the smoothed second candidate position.

8. The method of claim 7, wherein said selecting a determined position is further based on error associated with the smoothed first candidate position and the smoothed second candidate position.

9. The method of claim 1, wherein the inertial measurement unit comprises at least one of an accelerometer or a gyroscope.

10. The method of claim 1, further comprising:
- transitioning to an initialization mode of the respective anchor device responsive to powering on of the respective anchor device; and
- transitioning to a discovery mode upon determining that the respective anchor device is stationary,
- wherein the said monitoring the movement of the respective anchor device of the plurality of anchor devices is performed during the initialization mode, and
- wherein said collecting the set of ranges is performed with the respective anchor device in the discovery mode.

\* \* \* \* \*